J. H. VAN HOUTEN.
Carbureter.
No. 109,561. Patented Nov. 22, 1870.
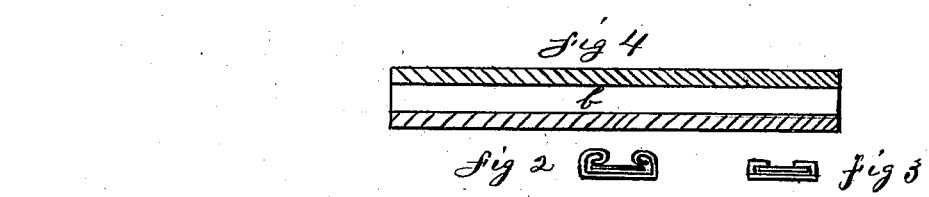
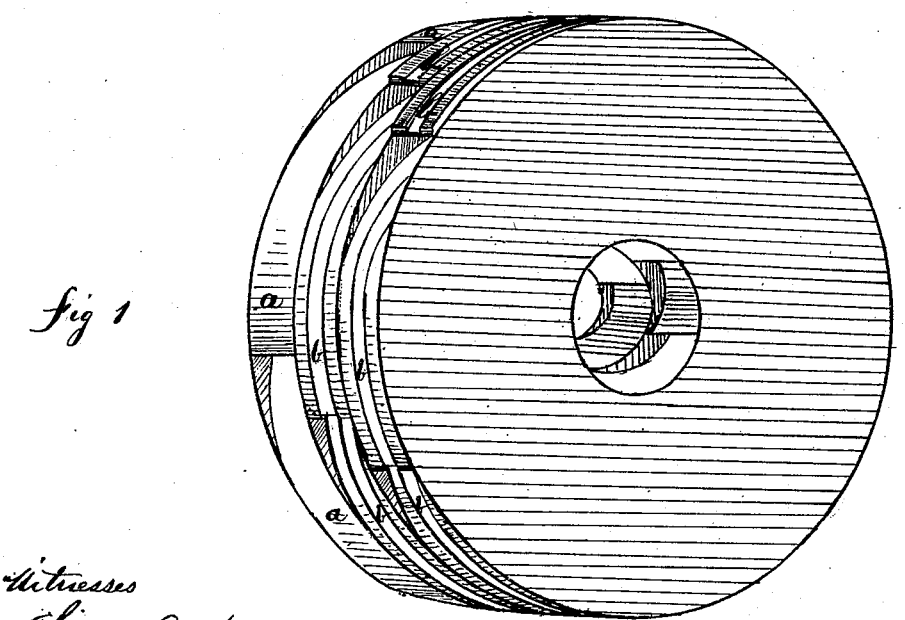

UNITED STATES PATENT OFFICE.

JAMES H. VAN HOUTEN, OF NEWARK, NEW JERSEY.

IMPROVEMENT IN AIR-CARBURETING WHEELS.

Specification forming part of Letters Patent No. 109,561, dated November 22, 1870.

*To all whom it may concern:*

Be it known that I, JAMES H. VAN HOUTEN, of Newark, in the county of Essex and State of New Jersey, have invented certain Improvements in Air-Carbureting Wheels, of which the following is a specification.

Figure 1 is a perspective view of an air-carbureting wheel, showing my improvements. The section marked $a$ shows the manner of constructing the wheel as heretofore in use. The sections marked $b$ show my improvements. Figs. 2, 3, and 4 are sectional views, showing also my improvements.

The wheels heretofore in use, of which mine is an improvement, were made of single sheet metal, as shown by the flue marked $a$ in Fig. 1, and have proved almost useless, from the fact that they soon burst open and leak. There is great difficulty also in soldering wheels made in this manner, from the fact that while one section is being soldered the adjoining section is liable to become unsoldered by the action of the heat, the edge of the single sheet of metal affording too slight a surface for the solder to hold securely, and should the wheel be soldered perfectly experience has shown that the wheel will not stand the pressure but a very short time.

My improvements consist in folding the edges of the strips forming the periphery of the wheel either one or more times, as shown in Figs. 2 and 3, and also by sections marked $b$ in Fig. 1, thus forming an ample surface for the solder, and rendering the wheel sufficiently strong to resist all the pressure that may be brought to bear upon it. Another difficulty in the wheels heretofore in use is that when made of tin they soon become rusty, and from this cause also will become worthless. In order to obviate this defect, as well as to render the wheel stronger, I insert a strip of zinc in such a manner that the edges of the tin, when folded, secure it firmly in its place, as shown in Figs. 2 and 3, thus making the wheel much stronger and not liable to rust. As the zinc galvanizes the tin these improvements are very important, as they have been thoroughly tested and give perfect satisfaction.

What I claim as new, and desire to secure by Letters Patent, is—

1. The edges of the metal, folded either one or more times, substantially as and for the purposes herein set forth.

2. In combination with the strips of metal forming the periphery of the wheel, the insertion therein of strips of zinc, substantially in the manner and for the purposes herein set forth.

JAMES H. VAN HOUTEN.

Witnesses:
OLIVER DRAKE,
JOHN ROSE.